United States Patent [19]
Trent

[11] Patent Number: 5,541,581
[45] Date of Patent: Jul. 30, 1996

[54] ELECTRONIC COMBINATION LOCK SECURITY SYSTEM

[75] Inventor: Douglas E. Trent, Roanoke, Va.

[73] Assignee: Medeco Security Locks, Inc., Salem, Va.

[21] Appl. No.: 280,819

[22] Filed: Jul. 26, 1994

Related U.S. Application Data

[63] Continuation-in-part of Ser. No. 26,781, Mar. 5, 1993, and Ser. No. 865,849, Apr. 9, 1992, which is a continuation-in-part of Ser. No. 522,017, May 11, 1990, Pat. No. 5,140,317.

[51] Int. Cl.⁶ .................................................. H04Q 1/00
[52] U.S. Cl. .................... 340/825.31; 70/283; 70/285; 70/278
[58] Field of Search ................. 340/825.31, 825.34; 341/35; 70/278, 284, 285, 283

[56] References Cited

U.S. PATENT DOCUMENTS

| | | | |
|---|---|---|---|
| 2,916,906 | 12/1959 | Miller | 70/284 |
| 3,455,125 | 7/1969 | Silva | 70/284 |
| 4,671,088 | 6/1987 | Jeang | 70/284 |
| 4,774,512 | 9/1988 | Jolidon | 70/284 |
| 4,789,859 | 12/1988 | Clarkson | 340/825.31 |
| 4,793,165 | 12/1988 | Rochman | 70/284 |
| 4,831,851 | 5/1989 | Larson | 70/303 |
| 4,904,984 | 2/1990 | Gartner et al. | 340/543 |
| 5,140,317 | 8/1992 | Hyatt | 340/825.31 |

*Primary Examiner*—Brian Zimmerman
*Attorney, Agent, or Firm*—Rothwell, Figg, Ernst & Kurz

[57] ABSTRACT

An electronic security system includes an electronic lock mechanism and an electronic key, each of which is provided with a microprocessor controller and a memory storing data including an ID code and encryption key codes. The lock microprocessor may either change ID codes stored in its memory or encrypt a seed number to be used for determining access to the lock. A novel combination dial electronic lock utilizes the electronic lock and key in association with a conventional combination lock dial to prevent rotation of the combination dial unless an authorized electronic key has been inserted into the electronic lock.

15 Claims, 13 Drawing Sheets

V-key Programmer

ELECTRONIC COMBINATION LOCK SECURITY SYSTEM

CROSS-REFERENCE TO RELATED APPLICATIONS

This application is a continuation-in-part of application Ser. No. 07/865,849 filed Apr. 9, 1992, which is a continuation-in-part of application Ser. No. 07/522,017 filed May 11, 1990, now U.S. Pat. No. 5,140,317. This application is also a continuation-in-part of copending application Ser. No. 08/026,781, filed Mar. 5, 1993.

BACKGROUND OF THE INVENTION

1. Field of the Invention

This invention relates generally to electronic security systems, and more particularly to electronic security systems for money or valuables-containing devices such as Automated Teller Machines (ATMs), safes, vaults, vending machines, or the like, which must be periodically accessed by authorized personnel in order to replenish or retrieve funds, or in order to secure valuables.

2. Background and Prior Art

As automated teller machines or ATMs have become ubiquitous and use of these machines for obtaining cash and making deposits has increased, the incidence of ATM tampering and fraud has also increased. ATMs are typically provided with combination dial locks, which may be picked by sophisticated criminals; additionally, there exists the possibility of internal fraud on the part of personnel in charge of servicing the ATMs.

Combination locks with additional electronic locks are generally known, see e.g., U.S. Pat. Nos. 4,904,984, 4,831,851, and 4,967,577. However, such devices require the complete redesign of the combination lock to accommodate the electronic lock, and are not retrofittable to an existing combination lock. Additionally, such devices are lacking in their ability to maintain adequate control and monitoring of personnel having access to the enclosures secured by such locks. There thus exists a need in the art for improvements to the security of combination dial locks such as used in ATMs and the like.

SUMMARY OF THE INVENTION

The present invention provides an electronic combination lock security system which overcomes the problems mentioned above.

The present invention provides an electronic security system comprising a lock including a bolt movable between a locked and an unlocked position, a key actuated lock cylinder having a bolt cam in contact with said bolt to prevent the bolt from moving when in a locked position, and operable upon actuation to move the bolt to the unlocked position, a retractable locking means for preventing the bolt from moving to the unlocked position when unretracted and allowing the bolt to be moved to the unlocked position when retracted, an electrically powered solenoid operable to retract the blocking means upon switching of power thereto, a microprocessor for controlling the switching of power to the solenoid, and a memory coupled to the microprocessor storing coded data.

The invention further includes key means insertable into the lock cylinder for supplying power to the solenoid to retract the blocking means and for actuating the lock cylinder to move the bolt to the unlocked position, including a power supply for supplying power to the solenoid, a controller, a memory storing coded data, and means for establishing electrical connection between the controller and the microprocessor through contact terminals in the lock cylinder for transmission of the coded data, in which the microprocessor includes means for comparing the coded data read from the key means with coded data stored in the coupled memory, and means for enabling the power supply of the key means to power the solenoid when the means for comparing has determined that the coded data from the key means matches the coded data in the coupled memory of the lock.

The present invention further provides a combination dial lock system having a housing for accommodating a combination dial and spindle coupled to a combination lock, and also for accommodating an electronic lock having a bolt mechanism for preventing rotation of the combination dial when in a protracted position, and allowing the dial to be rotated when in a retracted position, wherein the electronic lock includes means for receiving coded information from an electronic key, means for comparing the received coded information with internal authorization information and means for allowing the electronic key to retract the bolt mechanism when the received information correctly matches the authorization information.

In another embodiment, the invention includes the use of encryption key codes in the lock unit and in the key unit, each unit encrypting a seed number provided by the lock unit to determine whether the key has been authorized to access the lock. Upon successful access, the encryption key code in the key is overwritten with date stamp information to prevent further access.

BRIEF DESCRIPTION OF THE DRAWINGS

The present invention will become more fully understood from the detailed description given hereinbelow and the accompanying drawings which are given by way of illustration only, and are not limitative of the present invention, and wherein.

DETAILED DESCRIPTION OF THE PREFERRED EMBODIMENTS

Figure 1A:
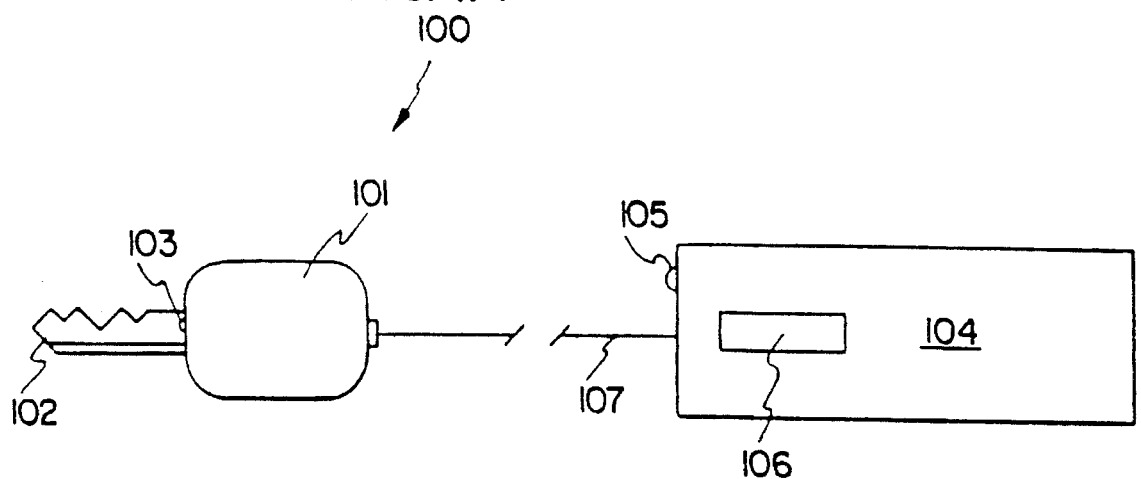
FIGS. 1A and 1B are side and end elevational views, respectively, of an electronic key with its own power supply according to one preferred embodiment of the present invention.
Figure 1B:
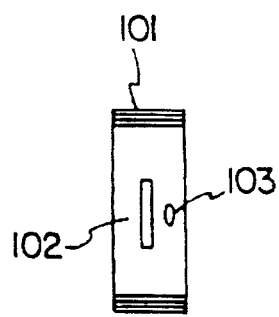

FIGS. 1A and 1B illustrate an electronic key 100 according to a first embodiment of the present invention. The key has a key body 101 which contains logic and power transfer circuitry, and a key blade 102 with appropriately cut key bits for operating pin tumblers as is known in the art. The key 100 also carries a spring loaded data and power electrical contact 103, which is made of a suitable material and is preferably gold plated.

Portable battery and logic housing 104 contains a battery power supply and electronic circuitry, a battery charging port 105, a wrist strap or belt clip 106, and a plug-connected cable 107 for transferring power and data signals between the housing 104 and the key body 101.

FIG. 1B is an end view of the key body showing the orientation of the spring loaded contact 103 with relation to the key blade 102. The key 100 and connected housing 104 with their components are portable and are referred to as "key means".

Figure 2:
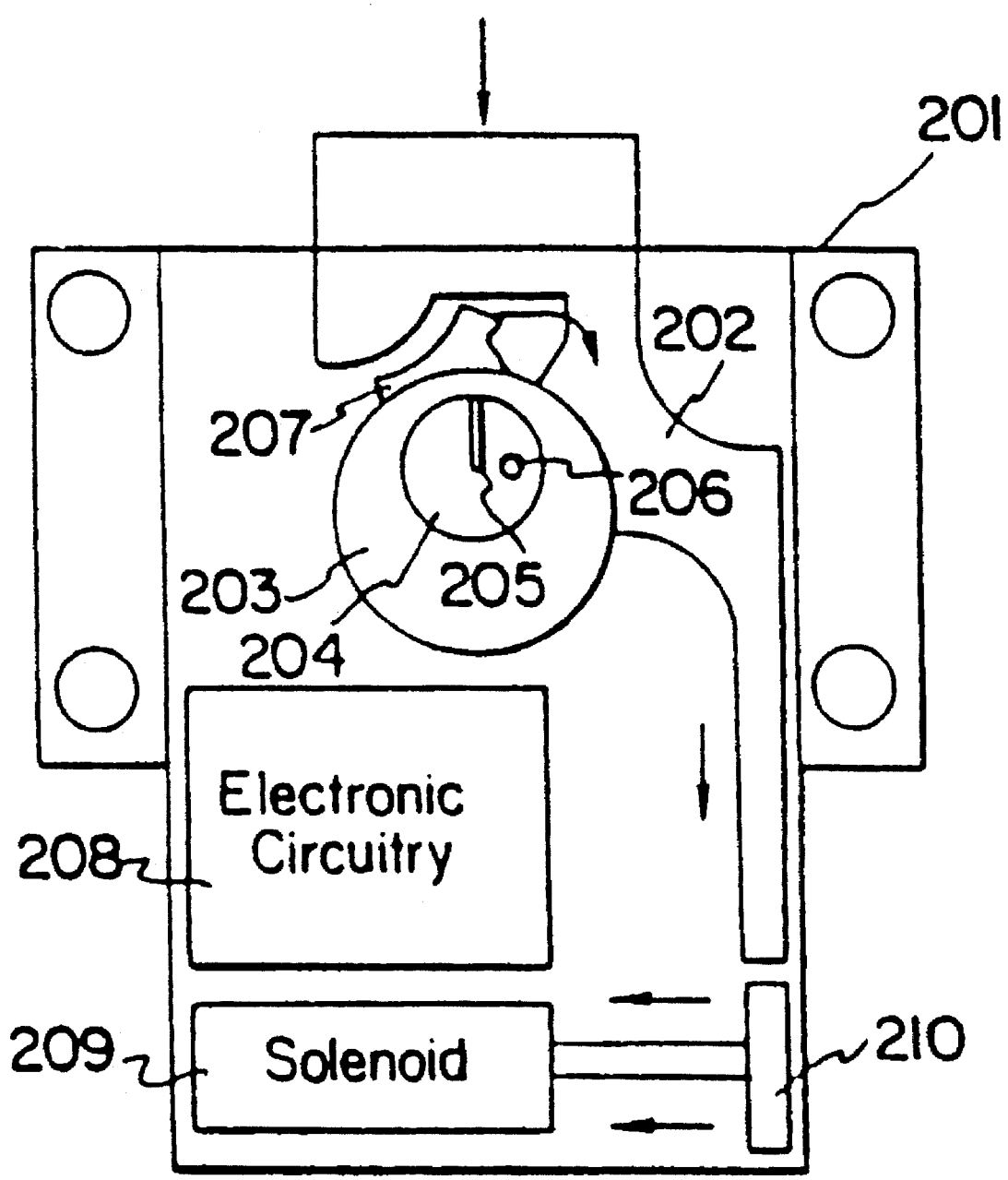
FIG. 2 is a front elevation view of a lock cylinder and associated mechanisms (shown with the housing cover removed) for operation with the key of FIGS. 1A and 1B.

FIG. 2 illustrates a lock cylinder and bolt mechanism according to one embodiment of the present invention, included in a housing 201 (with its cover removed). Within the housing is a bolt 202 operated by a lock cylinder 203 containing a key cylinder plug 204 having a keyway 205 for key blade 102, and an electrical contact 206 which makes contact with the power and data contact 103 of the key body when the key blade 102 is inserted into the key blade opening 205.

A bolt cam 207 is rotated by the lock cylinder 203 to move the bolt 202 between the locked position shown and an unlocked position in which the bolt is withdrawn downward to be substantially within the housing 201. The lock housing 201 further includes electronic logic circuitry 208 and an electrically powered solenoid 209. Solenoid 209 includes a spring biased bolt blocking plunger 210 which, when extended, prevents bolt 202 from being withdrawn by the bolt cam into the housing 201 to its unlocked position. Upon operation of the solenoid 209, bolt blocking plunger 210 is retracted toward the solenoid to enable the key 100 to be turned in the clockwise direction which rotates bolt cam 207 against the bolt 202 and causes the movement of the bolt 202 downward into the housing 201.

Figure 3:
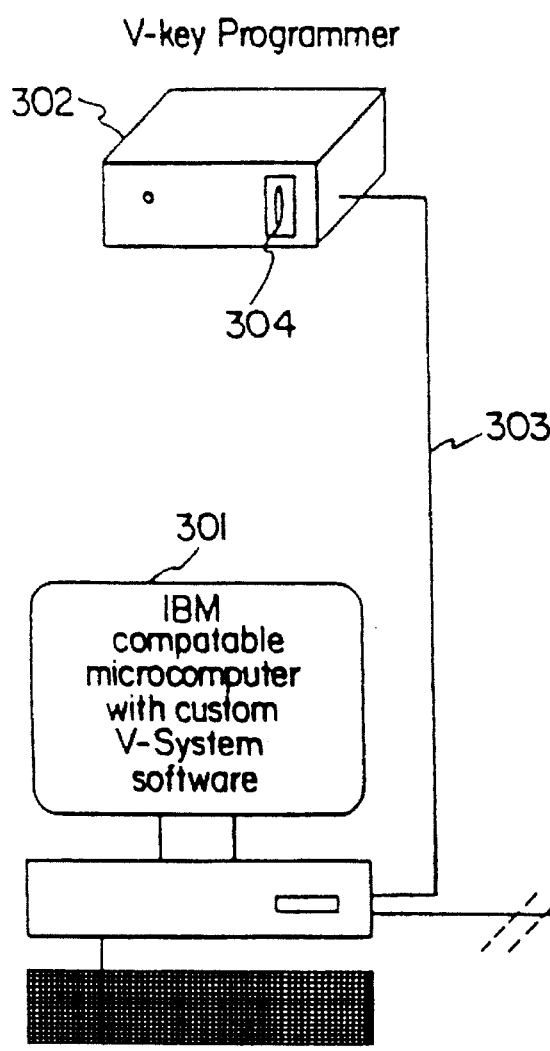
FIG. 3 is a schematic view of a first embodiment of an electronic key programmer according to the present invention.

FIG. 3 illustrates a programmer for writing data into and reading data from the circuitry in key body 104 through cable 107. The programmer includes a host computer 301 which may be a minicomputer, personal computer, or any other type of computer, but which preferably is an IBM® compatible microcomputer. A key programmer interface unit 302 is connected to the computer 301 by means of a cable 303 which plugs into a communication port of the computer 301. The programmer interface unit 302 contains a key receptacle 304 having electrical contacts into which the plug end of the key cable 107 is inserted after being disconnected from key body 101 to allow the computer to write into the memory within key housing 104. The computer 301 is loaded with a software program 305 for loading and retrieving files from the key logic housing 104.

Figure 4:
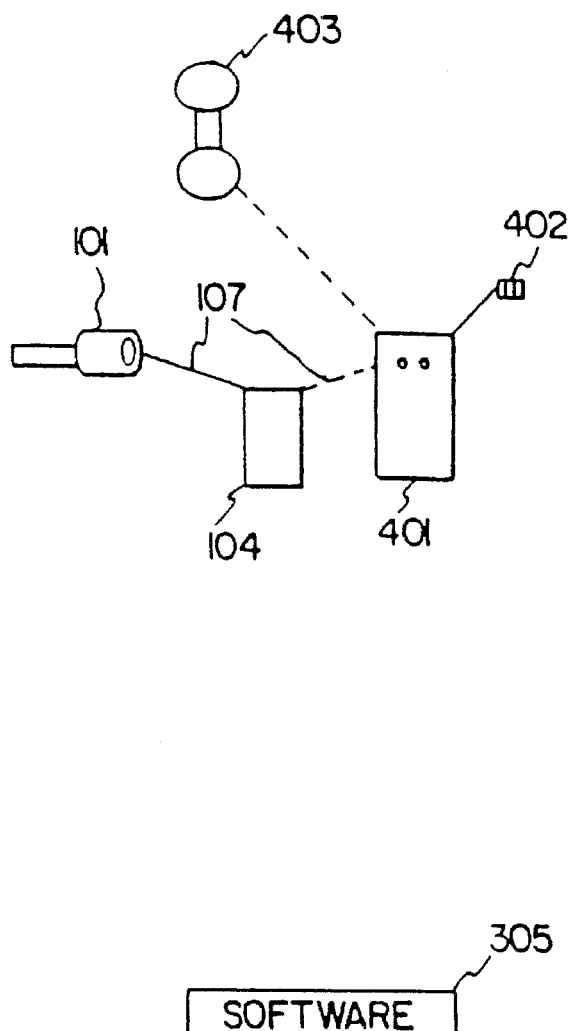
FIG. 4 is a schematic view of another embodiment of a portable key programmer according to the present invention.

FIG. 4 illustrates a portable programmer interface unit 401 including a modem which enables the portable programmer interface unit 401 to communicate with the computer 301 through the public switched telephone network (PSTN) via a standard phone jack 402. In this embodiment, an operator in the field needing to update the contents of files in the key housing 104 would dial up the host computer using a standard phone set 403 which is connectable via a jack to the programmer interface 401. Once communication with the host computer 301 is established, the programmer interface unit 401 operates in the same manner as the office programmer interface unit 302.

Figure 5:
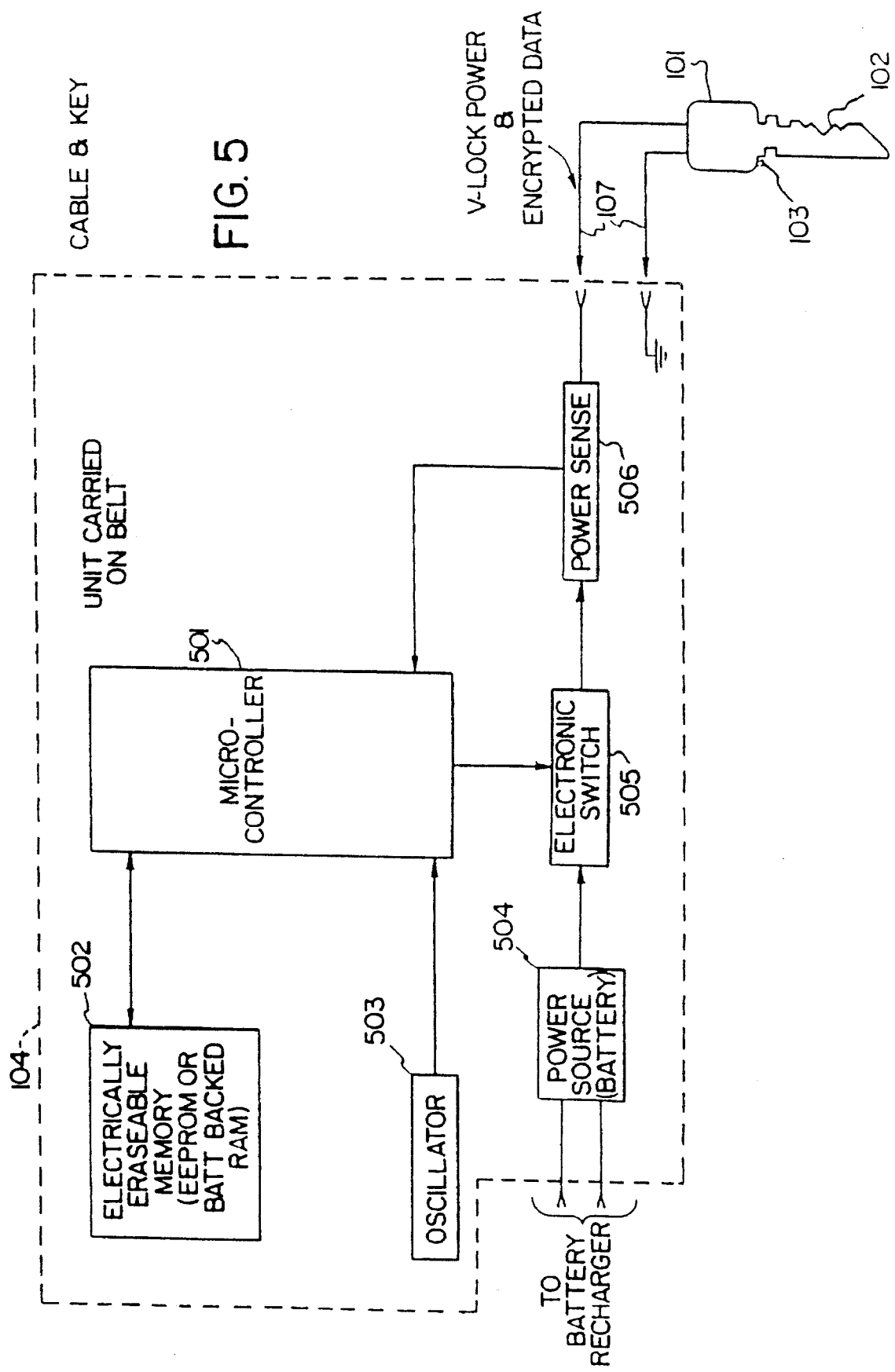
FIG. 5 is a schematic block diagram of the circuit elements of the electronic key of FIG. 1A.

FIG. 5 is a schematic block diagram illustrating the components within the electronic key housing 104. The components include a microcontroller or microprocessor 501, an electrically erasable programmable read only memory (EEPROM) 502 coupled to the controller 501, an oscillator or clock 503 which provides clock signals for the operation of controller 501, and a battery power source 504 which operates the controller 501 as well as the solenoid 209 and the circuitry 208 within the lock mechanism housing 201. The electronic key components further include an electronic switch 505 operated by the controller 501 and a power sensing circuit 506.

Figure 6:
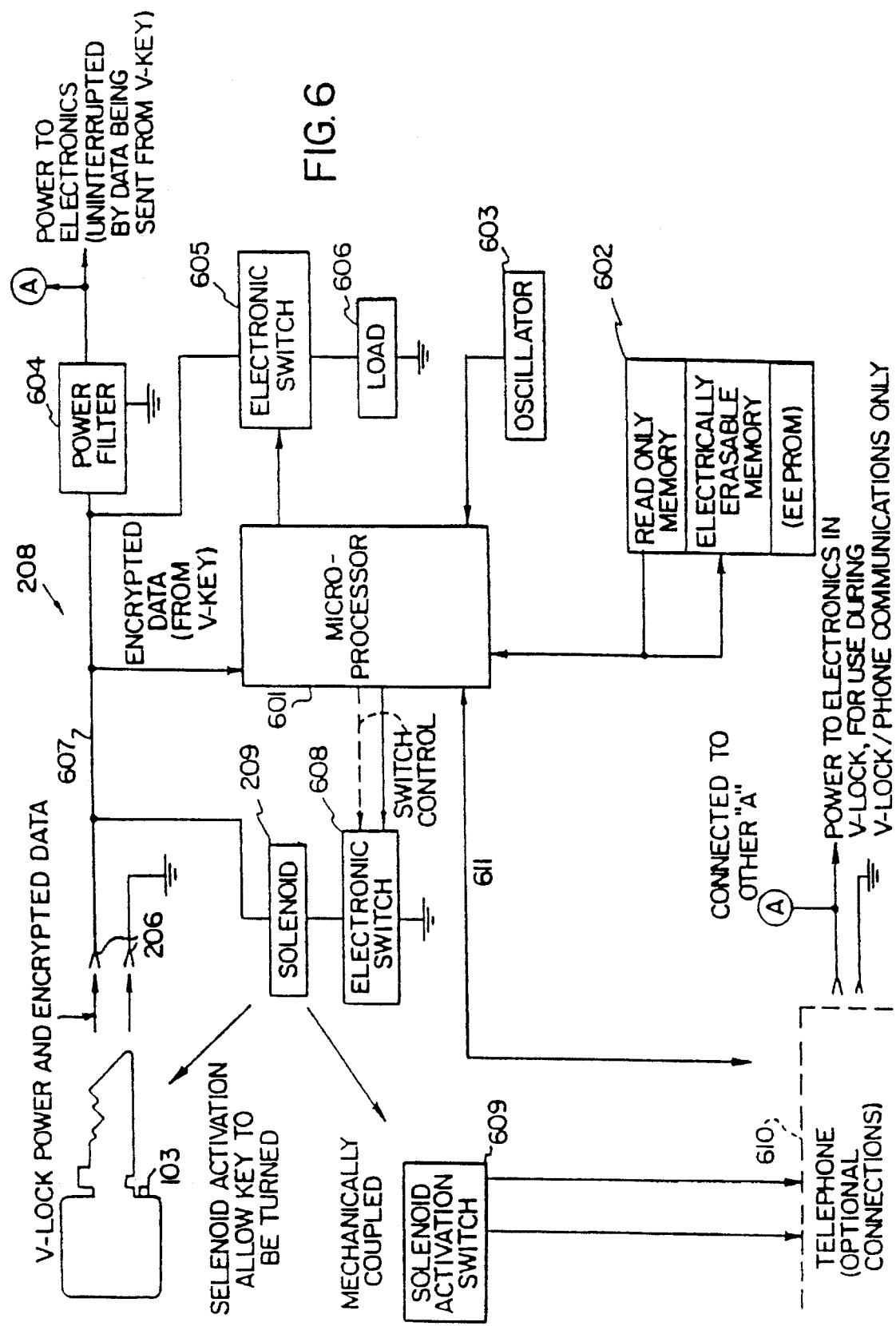
FIG. 6 is a schematic block diagram of the electronic components of the lock mechanism of FIG. 2.

FIG. 6 is a schematic block diagram of the electronic circuitry 208 within the lock housing 201. This circuitry includes a microprocessor 601, an EEPROM 602 coupled to the microprocessor 601, an oscillator or clock 603 for providing operational clock signals to the microprocessor 601, a power filter 604, electronic switch 605 and load 606 for transmission of signals to the key controller 501 via line 607, and an electronic switch 608 for allowing power to flow from power source 504 within the key housing 104 through cable 107 and contacts 103–206 through the solenoid 209 to ground to activate the solenoid.

Figure 7:
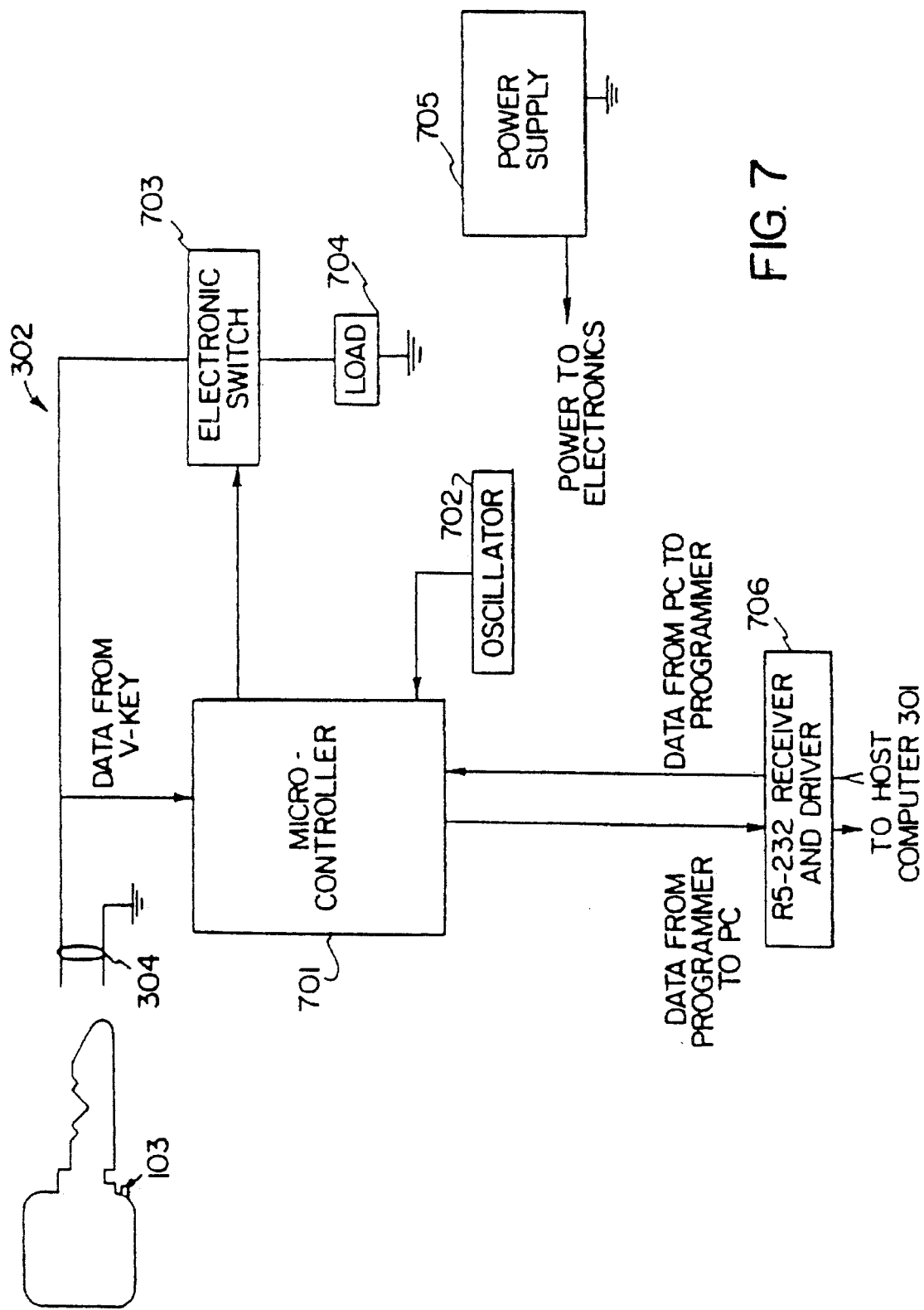
FIG. 7 is a schematic block diagram of the electronic key programmer of FIGS. 3 and 4.

FIG. 7 is a schematic diagram of the electronic key programmer interface unit 302. It is noted that the portable key programmer interface unit 401 contains substantially the same components as the programmer 302, in addition to the modem and telephone jack not shown. The programmer interface unit 302 includes a microcontroller 701, a clock oscillator 702, an electronic switch 703 and load 704 combination which operate similarly to the switch 605 and load 606, a power supply 705, and a standard RS-232 receiver and driver 706 which couples the programmer interface unit 302 to the host computer 301.

The operation of the system components will now be described with reference to FIGS. 5–7.

The electronic key 100 is inserted into the key programmer interface unit 302 or 401 to be programmed by the host computer running the customized software application 305 via cable 107 as described above.

Using the example of a lock for pay telephones for illustration, the EEPROM 502 is loaded with data corresponding to a specific collection route. The data can be entered manually through a keyboard provided with the host computer 301, or the data can be transferred to the EEPROM 502 from files on a floppy disk inserted into a standard floppy disk drive of the computer 301.

EEPROM 502 is loaded with specially encrypted data corresponding to specific ID codes stored in each of the electronic lock memories 602 of the locks on the specific collection route. Data encryption is performed by an encryption algorithm in a known manner. EEPROM 502 also is loaded with the date of key programming, the start date as of which the key is valid, and a time window during which the key can be used, for example, 24, 48 or 72 hours from the start date. EEPROM 502 also contains an address location storing the particular key category, for example, whether the key is a collection key or service key, and a serial number for key identification. The data is encrypted using a specific algorithm performed by the software 305.

The computer 301 may also print out the particular collection route, lock key codes, time window, and start date for confirmation by the programmer.

Controller 501 keeps track of the current time and date by counting the clock inputs of oscillator 503 and using the key programming date as a reference.

The data is written into EEPROM 502 through switching of electronic switch 703 by microcontroller 701 which serves to increase and decrease the amount of power consumed by the load 703 which in turn provides the logic levels for binary "1" and "0" digital communication to the microcontroller 501. This increase and decrease in power is sensed by the power sense circuit 506 and is converted into digital signals readable by the microcontroller 501.

Referring now to FIG. 6, the lock mechanism microprocessor 601 is coupled to EEPROM memory 602 which stores a specific ID code for that specific lock. One important feature of the present invention is that the lock mechanism of FIG. 2 contains no power supply itself but is completely powered by the power source 504 of the electronic key 100. Power filter 604 is provided to supply power to the logic circuits from the key 100 over line 607, the power filter smoothing the voltage waveform so that power interruptions caused by data transmission over line 607 will not affect the operation of the logic circuits.

As an additional security feature, a solenoid activation switch 609 can be mechanically coupled to the bolt blocking plunger 210 of FIG. 2 to detect the retraction of the bolt blocking plunger. In telephones equipped with a so-called "Smart Terminal" or circuit board 610, which is provided with a modem to link the telephone to the host computer over a telephone line, activation switch 609 can be used to send an alarm to the host computer when switch 609 detects the retraction of the bolt blocking plunger in the absence of generation of an enable signal by the microprocessor 601, which would be indicative of someone tampering with the lock by trying to manually pry the bolt blocking plunger away from bolt 202. An additional line 611 may be provided to establish communication between the lock microprocessor and the smart terminal 610.

The use of a smart telephone terminal 610 also allows the use of a host confirmation feature as an additional feature of the present invention. Part of the data stored in the key memory 502 is the key's particular serial number. Using the host confirmation feature, the host computer 301 would dial up the smart terminal 610 via a modem and transmit a host confirmation message to the microprocessor 601. The message may instruct the microprocessor to allow the solenoid 209 to be powered by any mechanically operable key inserted into the key slot 205, may instruct the microprocessor 601 to prevent any key at all from operating the lock by prohibiting powering of the solenoid 209, or may instruct the microprocessor 601 to allow only a key having a particular serial number, transmitted by the host computer, to operate the lock by powering the solenoid. The host confirmation data may then be stored in the memory 602 coupled to the microprocessor 601.

Figure 8:
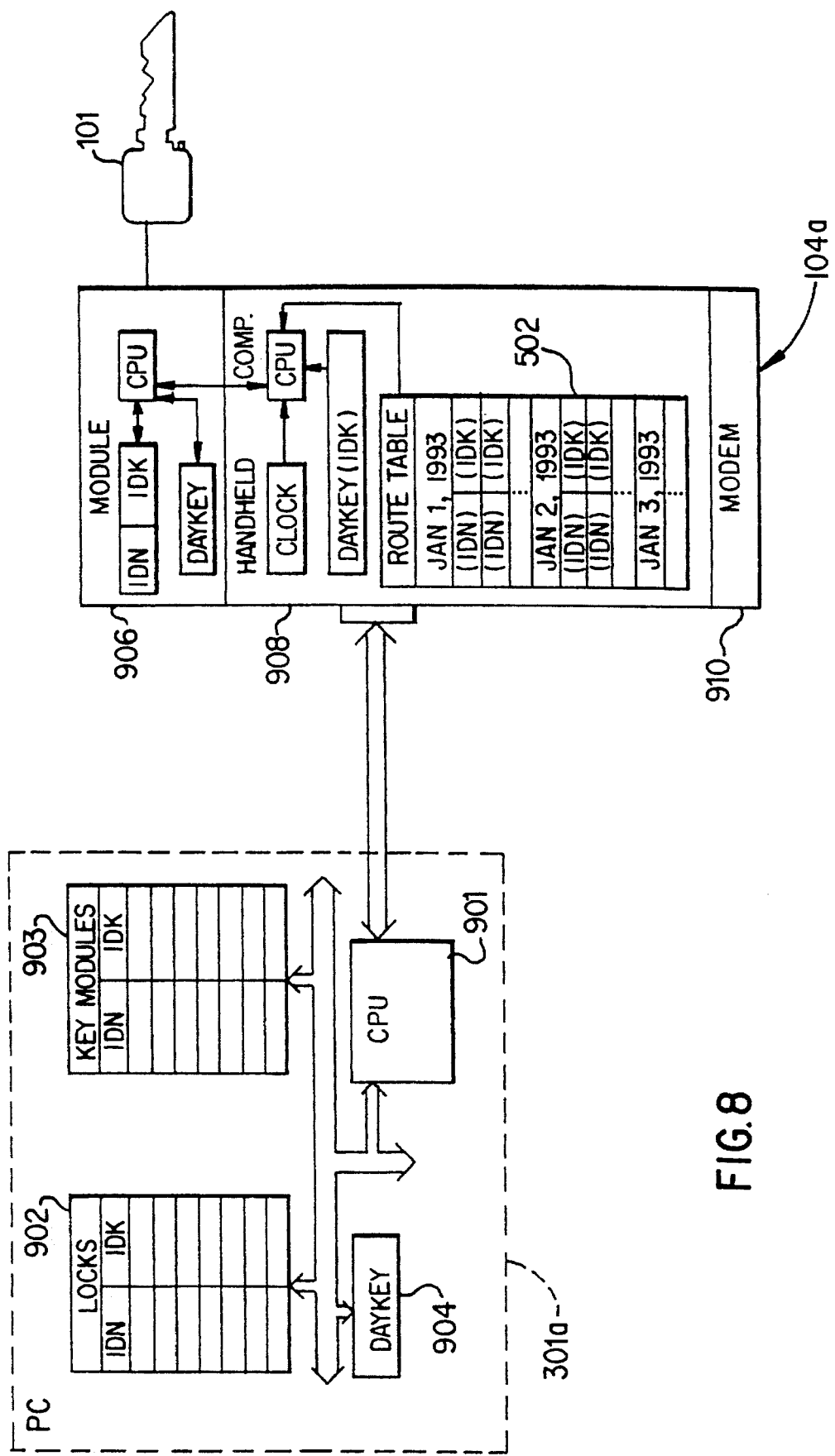
FIG. 8 is a schematic block diagram of an electronic key programmer and an electronic key unit according to a second embodiment of the present invention.

FIG. 8 illustrates a second preferred embodiment of a key unit programmer and electronic key according to the present invention. A programmer 301a, which may be similar to the microcomputer programmer 301 of FIG. 3, includes a CPU 901, a pair of look-up tables 902 and 903, and a daykey encrypter 904. Look-up table 902 contains a listing of various IDNs (identification numbers) and IDKs (encryption key codes) for each lock of the system. Every lock is identified by a lock identification number or IDN, and has associated therewith a corresponding encryption key code IDK which is used by the lock to encrypt data.

Look-up table 903 contains a listing of various IDNs and IDKs for each key unit 104a of the system. Each key unit 104a is also identified by a key IDN and has associated therewith a corresponding encryption key code IDK which is used by the key unit to encrypt data.

Daykey encrypter 904 contains an arbitrary encryption key code which is changed daily in the programmer 301a (thus the designation "daykey").

Key unit 104a includes a key module 906, a handheld computer 908, and optionally a modem 910. The module 906 interfaces the handheld computer 908 to the key device 101. Handheld computer 908 is a commercially available device such as a Panasonic Model JT-770, and may be implemented by any other equivalent apparatus. The computer 908 includes a key memory 502 which stores route stop information programmed from the programmer 301a. The route stop information is organized into a route table containing specific routes labeled by date. The key interface module 906 includes the IDN and IDK for the key unit 104a.

In operation, route stops for each collector are compiled by the programmer 301a. These route stops may be selected by a management operator, or may be downloaded into the programmer 301a from a central host management system. For each key unit 104a, which is identified by a particular key module IDN and corresponding encryption key code IDK, the programmer 301a compiles a set of locks which are to be serviced for collection (or other operations) by reading out a number of IDNs and associated IDKs of the locks to be accessed by the particular key unit 104a, from the look-up table 902, to thereby generate a route table for transmission to the key unit 104a.

The IDNs and IDKs of the various locks are encrypted by the encrypter 904 using the particular daykey encryption key code in use on that day. The daykey encryption key code is then itself encrypted using the IDK encryption key code of the specific key unit 104a for which the route table is being compiled. The encrypted daykey, denoted as DAYKEY-(IDK), is then also transmitted to the computer 908 of key unit 104a.

In the key unit 104a, the IDN identification number and IDK encryption key code are stored in the key interface module 906, while the encrypted daykey DAYKEY(IDK) and the encrypted route tables are stored in the key memory 502 of handheld computer 908.

Figure 11:
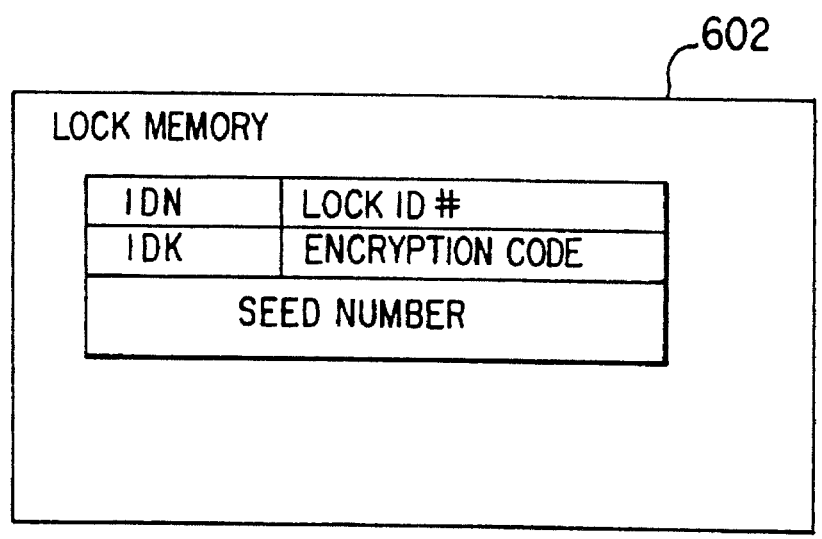
FIG. 11 is block diagram of the contents of lock memory 602 according to the second embodiment of the invention.

Referring now to FIG. 11, the lock memory 602 according to the second embodiment of the present invention contains the IDN or lock identification number of that particular lock, the IDK encryption code associated with that particular lock, and an arbitrary seed number. The seed number is simply a certain numerical value, the actual value of which is not relevant.

In order for the encrypted IDNs and IDKs of the route tables stored in memory 502 to be decrypted, the handheld computer 908 sends the encrypted daykey to the key interface module 906, which decrypts the DAYKEY(IDK) using its encryption key code IDK to obtain the decrypted daykey. The encrypted IDNs and IDKs are then sent to the module 906 to be decrypted using the daykey, and used by the module 906 in the verification process with the lock. This feature is intended as an additional security measure to achieve an even higher level of security, for the reason that the module 906 is an add-on feature to the computer 908 and is removable therefrom. Thus, in the event that the module is lost or stolen, neither the module nor the handheld computer can be used for access to any information with respect to lock ID codes or encryption key codes. Further, since the daykey encryption code is periodically changed in the programmer, the particular daykey stored in the module 906 is of limited use.

Figure 10:
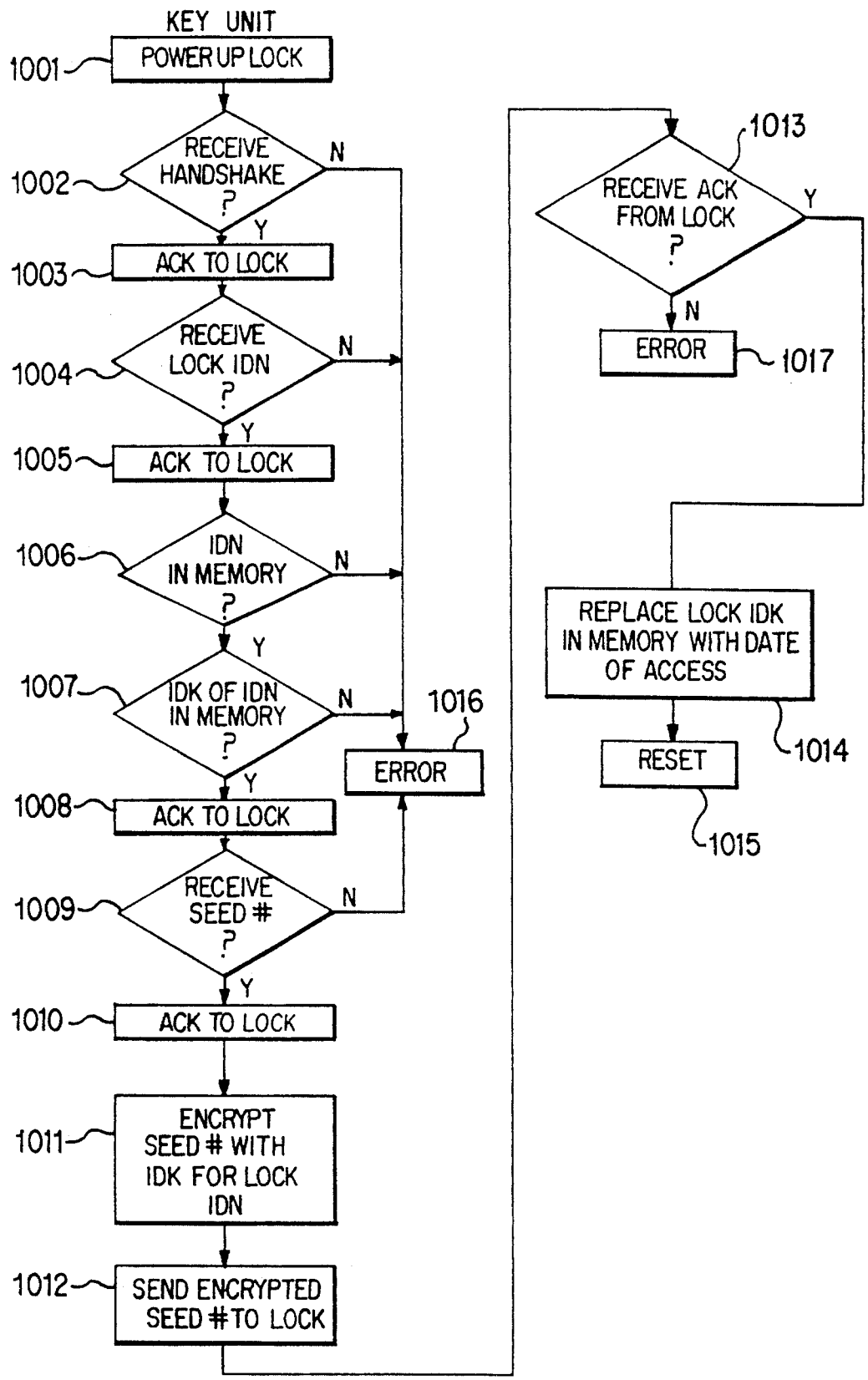
FIG. 10 is a flow chart diagram of the operation of the key unit 104a of FIG. 8.
Figure 10A:
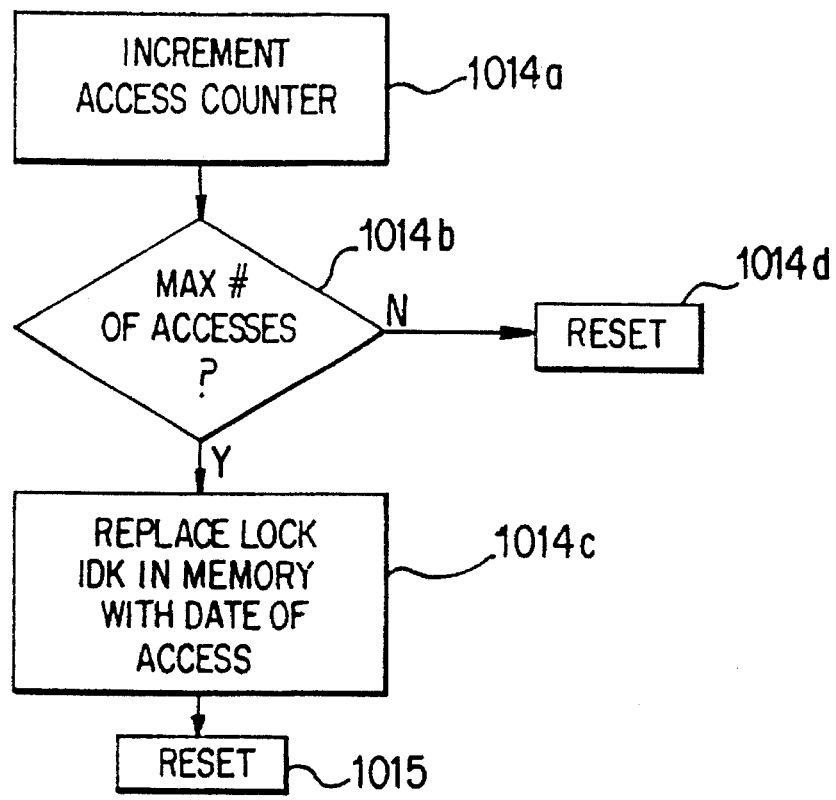
FIG. 10a is a flow chart diagram of an alternative routine for step 1014 of FIG. 10.
Figure 12:
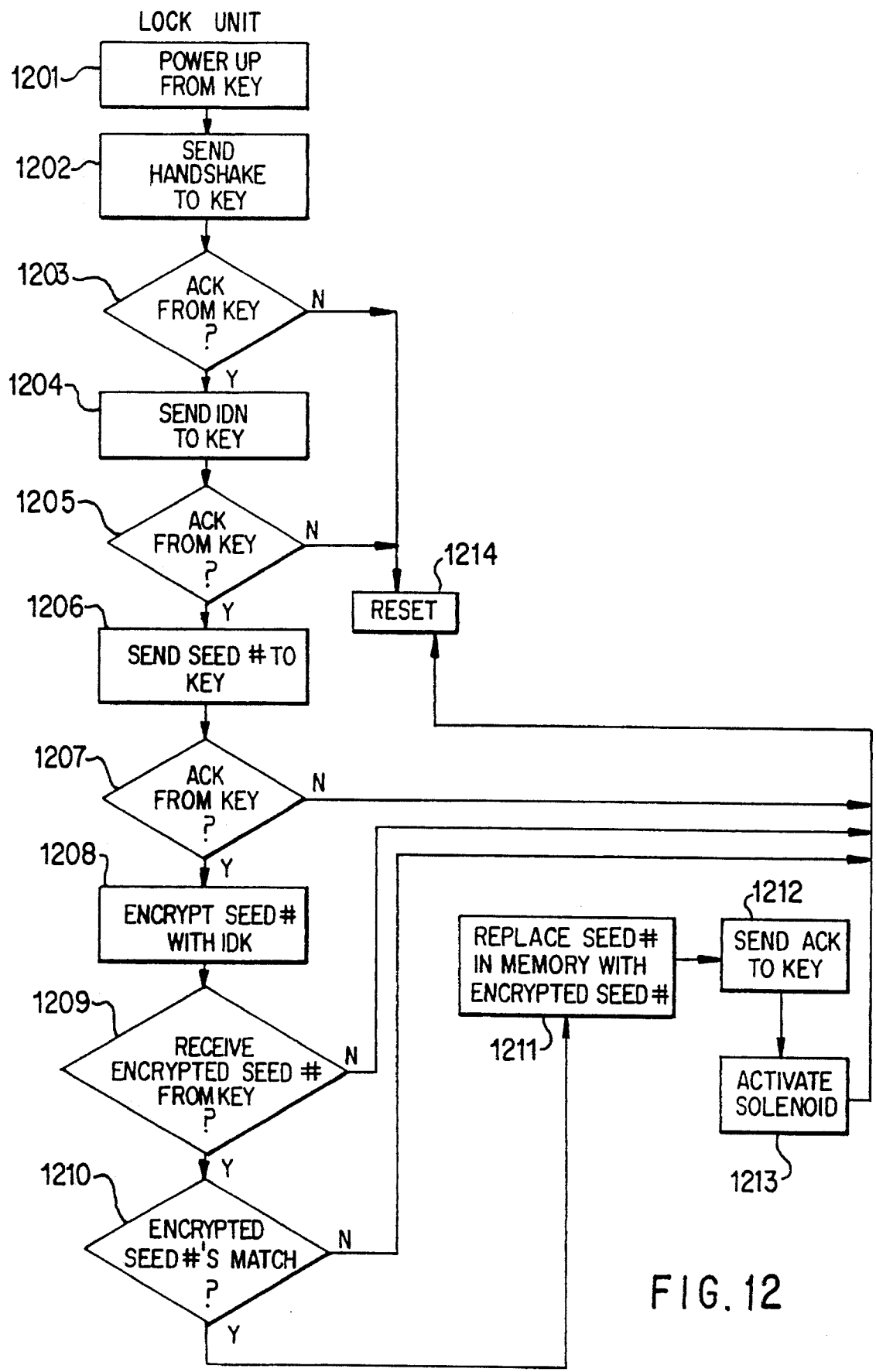
FIG. 12 is a flow chart diagram of the operation of the lock unit 201 according to the second embodiment of the invention.

Operation of the second embodiment of the key unit will now be described with reference to the flow chart diagrams of FIGS. 10, 10A, and 12.

Upon insertion of the key 101 into the keyway of the lock at step 1001, power is applied to the lock at step 1201. At step 1202, the lock sends a handshake protocol to the key, which receives the handshake at step 1002 and sends an acknowledge to the lock at step 1003. At step 1203, the lock recognizes the acknowledge and sends its IDN to the key at step 1204. The key receives the lock IDN and acknowledges at steps 1004 and 1005, and checks to see whether the lock's IDN exists in memory for the presently valid route table at step 1006. As previously mentioned, the route tables are labeled by date, and the computer 908 includes a clock for keeping track of the current date.

At step 1007, if the IDN is found, the key checks to see if the lock's corresponding IDK is found in memory for the particular IDN sent by the lock and acknowledges the lock if both IDN and IDK have been found, at step 1008. Upon receiving the acknowledge at step 1205, the lock sends the seed number from memory 602 to the key at step 1206. The key acknowledges receipt of the seed number at step 1010, and the lock then encrypts the seed number with its IDK at step 1208 upon receiving the acknowledge at step 1207.

The key also encrypts the seed number from the lock at step 1011, using the IDK found for the IDN received from the lock. At step 1012, the key sends the encrypted seed number to the lock, which receives it at step 1209. The lock then compares the encrypted seed number received from the key with the encrypted seed number which the lock itself generated, at step 1210. If the numbers match, the key is determined to be authorized to access the lock. At step 1211, the key writes the encrypted seed number into the memory 602 over the old seed number. The encrypted seed number will be used as the new seed number for the next access request from a key. At step 1212, the lock sends an acknowledge to the key to inform it of a successful access request, and activates the solenoid at step 1213. The lock then resets at step 1214. If any of the acknowledges from the key are not received within a predetermined amount of time, the lock routine also advances immediately to step 1214 for reset.

Upon receiving the acknowledge from the lock at step 1013, the key unit writes the date of access into the route table at step 1014, over the IDK previously stored there. As such, the key unit will thereafter not be able to access the lock without being reprogrammed by the programmer 301a.

Such can be accomplished either by bringing the key unit 104a back to the management center, or by calling into the programmer via modem 910 for reprogramming in the field.

The key unit then proceeds to step 1015 where it is reset for the next lock access attempt.

In an alternative mode of operation, the key unit may be programmed to have a set number of accesses to each lock before requiring reprogramming. Such is shown in FIG. 10A, wherein a counter is incremented at step 1014a, and the value stored in the counter is compared with a preset maximum number of accesses at step 1014b. If this number has been reached, the lock IDK is replaced by the date of access and the key unit is reset at steps 1014c and 1015; otherwise the key unit is immediately reset at step 1014d. In either event, additional access to the lock may be denied upon an attempted access to another lock.

Figure 9:
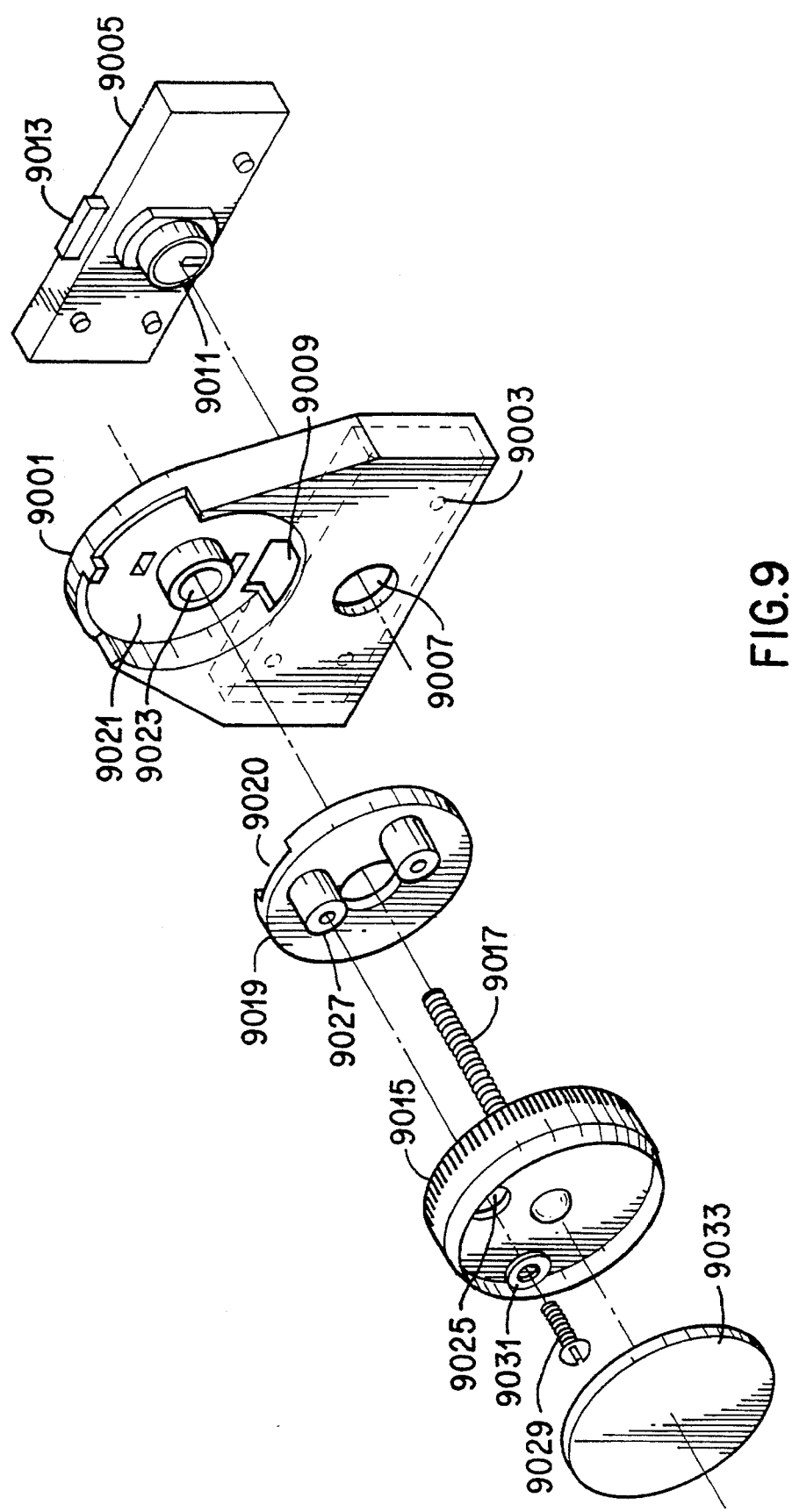
FIG. 9 is an exploded perspective view of one preferred embodiment of an electronic combination lock security system according to the present invention.

The novel combination dial electronic lock according to the present invention is now described with reference to FIGS. 9, 13A, 13B, and 14A–14C. As shown in FIG. 9, the electronic combination dial lock includes a housing 9001 which is mounted to one side of the door of an ATM machine, safe, vault or the like (not shown), on the other side of which is mounted a conventional combination lock as is well known. The housing 9001 contains an elongated recessed area 9003 for receiving and retaining electronic panel lock 9005. The electronic panel lock 9005 contains the same components as shown in FIGS. 2 and 6.

The housing 9001 further contains an aperture 9007 for receiving the lock cylinder 9011 of the panel lock 9005, and an aperture 9009 for receiving the bolt 9013 of the panel lock 9005. Lock cylinder 9011 corresponds to lock cylinder 203, and bolt 9013 corresponds to bolt 202, as shown in FIG. 2.

Housing 9001 also includes a circular recess 9021 for receiving and retaining combination dial 9015 and special adapter ring 9019. A spindle 9017 is connected to the combination dial 9015 and is inserted through the adapter ring 9019, through aperture 9023 in housing 9001, and through the door of the enclosure to engage and operate the combination lock in a well-known manner. The combination dial 9015 and spindle 9017 are standard commercially available components such as, for example, ILCO PN 670C01-26D dial and 5/16"×40 spindle. The adapter ring 9019 is provided with plugs 9027 which are received by corresponding apertures 9025 in the combination dial. The adapter ring is secured to the combination dial with a special washer 9031 and screw 9029. A dial cap 9033 is provided to cover the apertures in the combination dial.

Figure 14A:
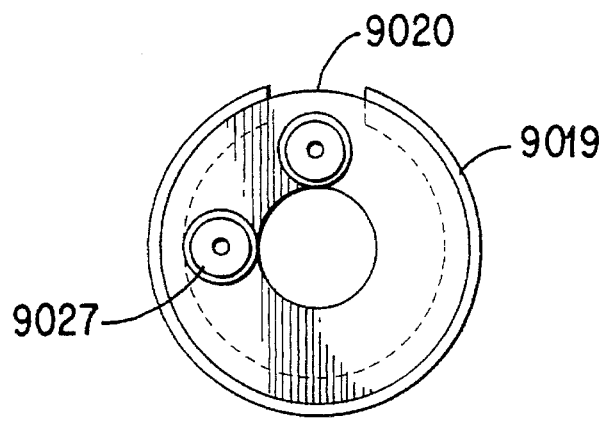
FIGS. 14A, 14B and 14C are front, back and side views of the special adapter ring of FIG. 9.
Figure 14B:
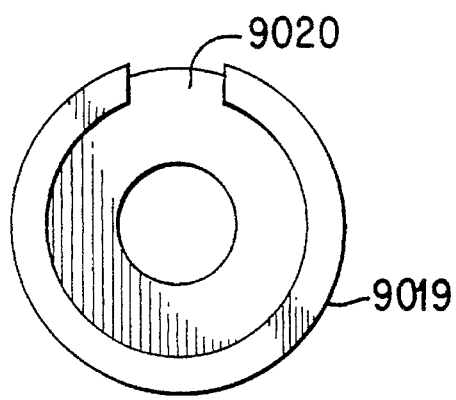
Figure 14C:
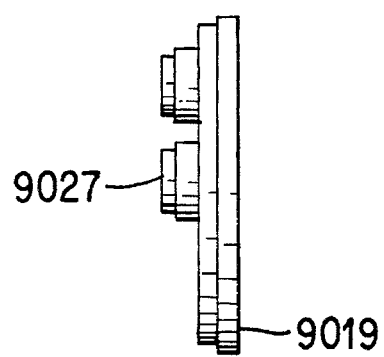

The adapter ring 9019 must be fixed to the combination dial 9015 such that there is no rotation of the adapter ring relative to the combination dial. The adapter ring 9019 includes a slot 9020, as best illustrated in FIGS. 14A and 14C, into which bolt 9013 of the electronic panel lock 9005 engages. With the bolt 9013 inserted into the slot 9020 of the adapter ring, it is not possible to rotate the combination dial 9015 in order to dial up the combination of the combination lock.

Figure 13B:
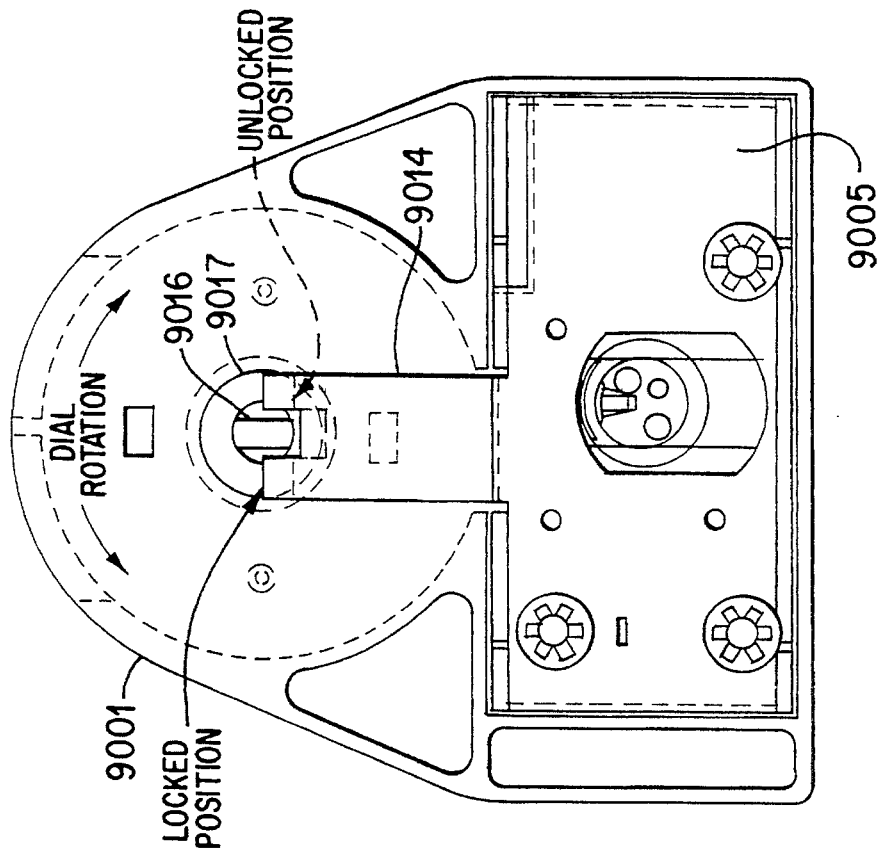
FIGS. 13A and 13B are rear plan views of alternative embodiments of the combination dial housing and electronic lock bolt mechanism according to the present invention.
Figure 13A:
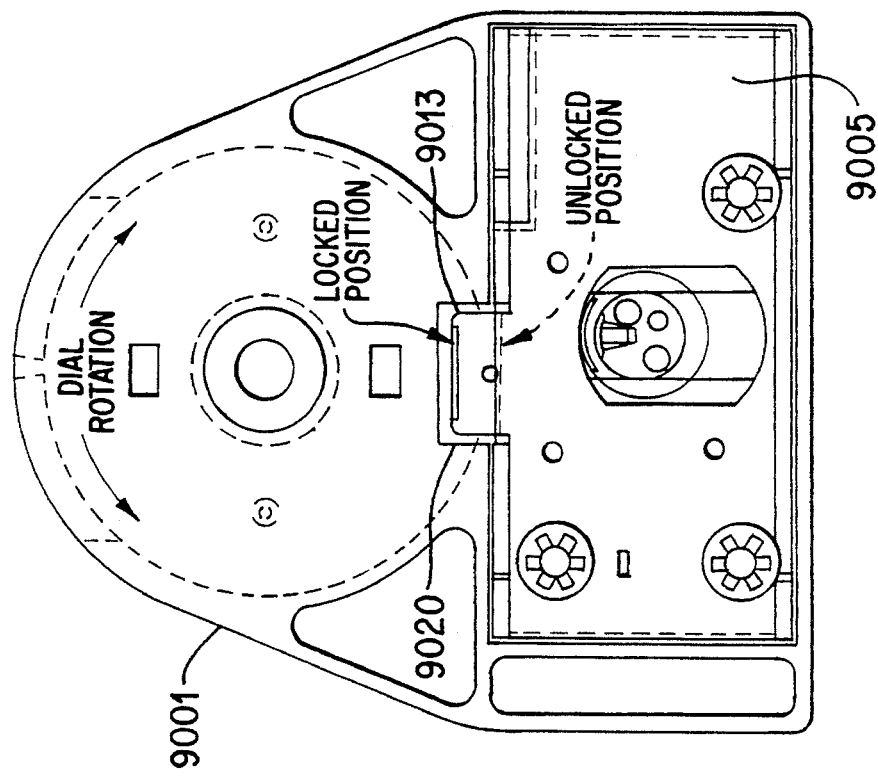

FIG. 13A illustrates the electronic panel lock 9005 mounted in the housing 9001 with the bolt 9013 in the locked position engaging the slot 9020 of the adapter ring. In an alternative embodiment as shown in FIG. 13B, the panel lock is provided with an elongated bolt 9014 which engages a semicircular extension 9017 on the adapter ring and also engages flat portions 9016 of the spindle in the locked position in order to prevent rotation of the combination dial.

While an adapter ring is described in the present invention for use with a conventional, commercially available combination dial and spindle, it is also possible to design a special combination dial and spindle to include a slot or other bolt-engaging mechanism for engagement with the bolt of the electronic panel lock without requiring the use of an adapter ring. The combination dial electronic lock of the present invention is fully retrofittable to existing doors with conventional combination locks with specified spindle types.

In operation, the combination lock will remain locked with the combination dial being spun and the dial set to zero to align the slot 9020 with the aperture 9009 such that the bolt 9013 is protracted into the slot 9020. With the bolt so engaged, an unauthorized person will be prevented from rotating the combination dial to dial up the combination of the lock, even if such combination is known to that person. In order to gain access to the combination dial, an authorized user must first insert the key 101 of the electronic key unit 104 or 104*a* according to the present invention into the lock cylinder 9011 of the electronic panel lock 9005 to initiate the operational sequence of the lock as described above. Once the inserted key unit has been verified in the electronic panel lock, the user will be allowed to rotate the lock cylinder to move bolt 9013 to the retracted position, thus enabling the combination dial to be rotated to dial up the combination of the lock and gain access to the enclosure. The access by the user may be recorded in the memory of the key unit and/or the memory of the electronic panel lock, along with the time and date of access.

When the authorized user is finished with access, the user will close and latch the door, spin the combination dial, and set the combination dial to the zero index position. At this time, the slot 9020 will be aligned with the bolt 9013 of the electronic panel lock, so that the user may then rotate the lock cylinder 9011 to protract the bolt into the slot and lock the combination dial in place.

While the electronic lock unit has been described with reference to a solenoid-operated bolt blocking mechanism and key-operated lock cylinder, it is also possible to eliminate the lock cylinder and bolt-blocking mechanism and directly operate the bolt in response to the verification by the electronic lock of an inserted key unit, to thereby unlock the combination dial without requiring the rotation of the key unit in the electronic lock.

The invention being thus described, it will be apparent to those skilled in the art that the same may be varied in many ways without departing from the spirit and scope of the invention. Any and all such modifications are intended to be included within the scope of the following claims.

What is claimed is:

1. A combination dial lock system, comprising:

a housing accommodating a combination dial and a spindle coupled to said dial and to a combination lock, and also accommodating an electronic lock having a bolt mechanism for preventing rotation of the combination dial when in a protracted position, and allowing the dial to be rotated when in a retracted position, wherein the electronic lock includes means for receiving coded information from an electronic key, means for comparing the received coded information with internal authorization information, and means for allowing the electronic key to retract the bolt mechanism when the received information correctly matches the authorization information;

and wherein the combination dial lock system further includes an adapter ring rigidly attached to said combination dial, said adapter ring including means for receiving said bolt mechanism and thereby preventing rotation of said combination dial, said adapter ring enabling a standard combination dial to be employed in said system.

2. An electronic combination lock security system, comprising:

a combination dial and spindle assembly coupled to a combination lock;

means on said combination dial and spindle assembly for receiving a bolt;

an electronic lock including a bolt being received by said receiving means in a protracted locked position to prevent rotation of said combination dial and being retracted from said receiving means in a retracted unlocked position to allow rotation of said combination dial; and means for operating said electronic lock to move said bolt between locked and unlocked positions;

said receiving means comprising an adapter ring rigidly secured to said combination dial, said adapter ring enabling said combination dial and spindle assembly to be a standard adapted for use in said system.

3. An electronic combination lock security system according to claim 2, wherein said adapter ring includes an extension protruding therefrom and engaging with said bolt.

4. An electronic combination lock security system according to claim 2, wherein said adapter ring includes a slot for receiving said bolt.

5. An electronic combination lock security system according to claim 2, wherein said electronic lock includes a lock cylinder for engaging and moving said bolt through rotation.

6. An electronic combination lock security system according to claim 5, wherein said operating means comprises an electronic key insertable into said lock cylinder of said electronic lock.

7. An electronic combination lock security system according to claim 6, wherein said electronic lock further includes a bolt blocking mechanism engageable with said bolt for preventing movement of said bolt by rotation of said lock cylinder.

8. An electronic combination lock security system according to claim 7, wherein said electronic lock further includes a solenoid for selectively retracting said bolt blocking mechanism out of engagement with said bolt.

9. A combination lock system comprising:

a combination dial and spindle assembly coupled to a combination lock for operating said combination lock;

means for selectively engaging said combination dial and spindle assembly to prevent rotation of said combination dial; and means for actuating said engaging means to selectively disengage said combination dial and spindle assembly to allow rotation of said combination dial;

wherein said combination dial and spindle assembly includes an adapter ring secured to said combination dial and including means for receiving a bolt; and wherein said engaging means includes a bolt receivable by said receiving means;

said adapter ring enabling said combination dial and spindle assembly to be a standard adapted for use in said system.

10. An electronic combination lock security system according to claim 9, wherein said receiving means comprises a slot.

11. An electronic combination lock security system according to claim 9, wherein said receiving means comprises an extension protruding from said adapter ring.

12. An electronic combination lock security system according to claim 9, wherein said engaging means further comprises an electronic lock having means for extending and retracting said bolt.

13. An electronic combination lock security system according to claim 12, wherein said actuating means comprises an electronic key for operating said electronic lock to selectively retract said bolt.

14. An electronic combination lock security system according to claim 13, wherein said electronic lock further comprises a lock cylinder for moving said bolt and said electronic key operates said electronic lock by being inserted into said lock cylinder and rotating said lock cylinder.

15. An electronic combination lock security system according to claim 14, wherein said electronic lock further comprises a bolt blocking mechanism engaging said bolt for preventing retraction of said bolt and a solenoid for selectively disengaging said bolt blocking mechanism from said bolt.

* * * * *